(12) United States Patent
Cronin et al.

(10) Patent No.: US 10,015,244 B1
(45) Date of Patent: Jul. 3, 2018

(54) SELF-PUBLISHING WORKFLOW

(71) Applicant: Rich Media Ventures, LLC, Miami, FL (US)

(72) Inventors: John Cronin, Bonita Springs, FL (US); Neil Balthaser, Montreal (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

(21) Appl. No.: 15/142,419

(22) Filed: Apr. 29, 2016

(51) Int. Cl.
- H04L 29/08 (2006.01)
- H04L 12/58 (2006.01)
- G06F 17/24 (2006.01)

(52) U.S. Cl.
CPC ............ *H04L 67/104* (2013.01); *G06F 17/24* (2013.01); *H04L 51/04* (2013.01); *H04L 67/20* (2013.01)

(58) Field of Classification Search
CPC ...................................................... G06F 17/24
See application file for complete search history.

(56) References Cited

U.S. PATENT DOCUMENTS

| | | | |
|---|---|---|---|
| 6,011,537 A | 1/2000 | Slotznick | |
| 6,189,097 B1* | 2/2001 | Tycksen, Jr. | ........ H04L 9/3247 713/100 |
| 6,341,174 B1 | 1/2002 | Callahan et al. | |
| 6,480,861 B1* | 11/2002 | Kanevsky | ................. G06F 9/50 |
| 6,611,358 B1 | 8/2003 | Narayanaswamy | |
| 6,704,024 B2 | 3/2004 | Robotham et al. | |
| 7,213,062 B1* | 5/2007 | Raciborski | ........ G06F 17/30864 707/E17.108 |
| 7,263,685 B2* | 8/2007 | Eldar | .................... G06F 9/4411 717/101 |
| 7,298,851 B1 | 11/2007 | Hendricks et al. | |
| 7,552,068 B1 | 6/2009 | Brinkerhoff | |
| 7,620,555 B1* | 11/2009 | Plotkin | .................. G06Q 10/00 705/1.1 |
| 7,711,513 B2* | 5/2010 | Sotiriou | ................... A45C 5/14 326/93 |
| 7,941,399 B2* | 5/2011 | Bailor | ..................... G06F 17/24 707/608 |

(Continued)

OTHER PUBLICATIONS

U.S. Appl. No. 15/142,819 Office Action dated Dec. 1, 2016.

(Continued)

*Primary Examiner* — Lashonda Jacobs
(74) *Attorney, Agent, or Firm* — Polsinelli LLP (57) ABSTRACT

An author using an author device may connect to a publishing network, which in turn may be connected to a number of service provider networks that provide services relating to publishing workflow (e.g., editing, typography, historical research, cover designing) and business (e.g., marketing, promotion, author events). The publishing network may provide a network portal for the author and network portals for various service providers, with graphical user interfaces for both the author and the service providers. The author can then select specific service providers based on ratings, posted service rates, special requirements such as time scheduling and genre specialization, and can hire those service providers to work with the author's on or with the author's manuscript through the publishing network. The publishing network may then generate an agreement and track its signing as well as other milestones in the working relationship.

20 Claims, 8 Drawing Sheets

(56) References Cited

U.S. PATENT DOCUMENTS

| | | |
|---|---|---|
| 8,005,825 B1 | 8/2011 | Ghosh |
| 8,312,079 B2 | 11/2012 | Newsome et al. |
| 8,346,585 B1 * | 1/2013 | Griffith .............. G06Q 30/0623 |
| | | 705/7.11 |
| 8,392,538 B1 | 3/2013 | Lee |
| 8,423,889 B1 | 4/2013 | Zagorie et al. |
| 8,487,775 B2 | 7/2013 | Victor et al. |
| 8,666,961 B1 * | 3/2014 | Qureshi ............ G06F 17/30312 |
| | | 707/705 |
| 8,700,699 B2 | 4/2014 | Shen et al. |
| 8,725,565 B1 | 5/2014 | Ryan |
| 8,755,058 B1 | 6/2014 | Jackson |
| 8,826,036 B1 | 9/2014 | Snodgrass et al. |
| 8,885,882 B1 | 11/2014 | Yin et al. |
| 8,922,569 B1 | 12/2014 | Tidd |
| 9,087,056 B2 | 7/2015 | Cohen |
| 9,116,991 B2 | 8/2015 | Vemula et al. |
| 9,317,186 B2 * | 4/2016 | MacLean .............. G06F 3/0483 |
| 9,331,856 B1 * | 5/2016 | Song .................... H04L 9/3247 |
| 9,348,935 B2 | 5/2016 | Doig et al. |
| 9,378,299 B1 | 6/2016 | Rashidi |
| 9,575,615 B1 | 2/2017 | Nicholls et al. |
| 9,864,737 B1 | 1/2018 | Cronin |
| 9,886,172 B1 | 2/2018 | Cronin |
| 2002/0006788 A1 | 1/2002 | Knutsson et al. |
| 2003/0172052 A1 | 9/2003 | Crandell et al. |
| 2003/0177200 A1 * | 9/2003 | Laughlin ........... G06F 17/30905 |
| | | 709/218 |
| 2004/0107348 A1 * | 6/2004 | Iwamura ............ H04N 1/32128 |
| | | 713/176 |
| 2005/0039034 A1 | 2/2005 | Doyle et al. |
| 2005/0071758 A1 | 3/2005 | Ehrich et al. |
| 2005/0081041 A1 | 4/2005 | Hwang |
| 2005/0177805 A1 | 8/2005 | Lynch et al. |
| 2005/0193335 A1 | 9/2005 | Dorai et al. |
| 2006/0218476 A1 * | 9/2006 | Gombert ................ G06Q 10/10 |
| | | 715/205 |
| 2007/0168237 A1 | 7/2007 | Campbell |
| 2007/0239704 A1 * | 10/2007 | Burns ............... G06F 17/30864 |
| 2008/0013915 A1 * | 1/2008 | Gill ........................ G06Q 10/04 |
| | | 386/281 |
| 2008/0139191 A1 | 6/2008 | Meinyk et al. |
| 2008/0232598 A1 | 9/2008 | Vennelakanti et al. |
| 2008/0243662 A1 * | 10/2008 | Subramaniam ........ G06Q 10/10 |
| | | 705/35 |
| 2009/0019356 A1 | 1/2009 | Deyab et al. |
| 2009/0254802 A1 * | 10/2009 | Campagna ............ G06F 17/248 |
| | | 715/209 |
| 2010/0003333 A1 | 1/2010 | Victor et al. |
| 2010/0086278 A1 | 4/2010 | Stankiewicz et al. |
| 2010/0205029 A1 * | 8/2010 | Asherman ............ G06Q 20/382 |
| | | 705/64 |
| 2011/0055191 A1 | 3/2011 | Bain |
| 2011/0213655 A1 | 9/2011 | Henkin et al. |
| 2011/0289108 A1 | 11/2011 | Bhandari et al. |
| 2012/0047455 A1 | 2/2012 | Yuan et al. |
| 2012/0105486 A1 | 5/2012 | Lankford et al. |
| 2012/0150680 A1 * | 6/2012 | Golus ................. G06F 17/3089 |
| | | 705/26.5 |
| 2012/0150993 A1 | 6/2012 | Flack et al. |
| 2012/0192254 A1 | 7/2012 | Garcia Perez et al. |
| 2012/0200573 A1 | 8/2012 | Stoner et al. |
| 2012/0240039 A1 * | 9/2012 | Walker ................... G06Q 10/10 |
| | | 715/265 |
| 2012/0246557 A1 | 9/2012 | Venugopal et al. |
| 2012/0323842 A1 | 12/2012 | Izhikevich et al. |
| 2012/0325901 A1 * | 12/2012 | Ross ................. G06F 17/30879 |
| | | 235/375 |
| 2013/0007036 A1 | 1/2013 | Childs et al. |
| 2013/0054622 A1 | 2/2013 | Karmarkar et al. |
| 2013/0066746 A1 * | 3/2013 | O'Hara ................... G06Q 30/06 |
| | | 705/27.1 |
| 2013/0132230 A1 | 5/2013 | Gibson et al. |
| 2013/0132820 A1 | 5/2013 | Poindessault |
| 2013/0166340 A1 | 6/2013 | Salame |
| 2013/0191708 A1 | 7/2013 | Song |
| 2013/0205232 A1 | 8/2013 | Vandermolen et al. |
| 2013/0283147 A1 | 10/2013 | Wong et al. |
| 2014/0006308 A1 | 1/2014 | Baggott et al. |
| 2014/0019562 A1 | 1/2014 | Le Chevalier et al. |
| 2014/0019766 A1 * | 1/2014 | Takahashi .............. H04L 9/3231 |
| | | 713/176 |
| 2014/0074648 A1 | 3/2014 | Morton et al. |
| 2014/0115449 A1 * | 4/2014 | Migos ................. G06F 17/2229 |
| | | 715/251 |
| 2014/0115508 A1 * | 4/2014 | MacLean .............. G06F 3/0483 |
| | | 715/764 |
| 2014/0172505 A1 * | 6/2014 | Dekhtyaruk ....... G06Q 30/0282 |
| | | 705/7.32 |
| 2014/0201180 A1 | 7/2014 | Fatourechi et al. |
| 2014/0210855 A1 | 7/2014 | Cohen |
| 2014/0229810 A1 | 8/2014 | Ramanathan et al. |
| 2014/0253694 A1 | 9/2014 | Zustak et al. |
| 2015/0019874 A1 | 1/2015 | Kim et al. |
| 2015/0046827 A1 | 2/2015 | Akselrod et al. |
| 2015/0082156 A1 * | 3/2015 | Rollins .................... G06F 17/27 |
| | | 715/255 |
| 2015/0154660 A1 | 6/2015 | Weald et al. |
| 2015/0286489 A1 | 10/2015 | Brown, Jr. et al. |
| 2015/0356060 A1 * | 12/2015 | Peden ...................... G06F 17/24 |
| | | 715/255 |
| 2015/0370331 A1 | 12/2015 | Gonzales |
| 2016/0110789 A1 * | 4/2016 | Gilb ................... G06Q 30/0282 |
| | | 705/26.44 |
| 2017/0243277 A1 * | 8/2017 | You .................... G06Q 30/0631 |

OTHER PUBLICATIONS

U.S. Appl. No. 15/142,401 Office Action dated Nov. 4, 2016.
U.S. Appl. No. 15/142,095 Office Action dated Nov. 17, 2016.
U.S. Appl. No. 15/143,192 Office Action dated Nov. 21, 2016.
White, Ron; "How Computers Work", 2003 7th Edition, p. 4.
U.S. Appl. No. 15/142,831 Office Action dated Sep. 22, 2016.
U.S. Appl. No. 15/142,410 Office Action dated Sep. 8, 2016.
U.S. Appl. No. 15/142,401 Office Action dated May 8, 2017.
U.S. Appl. No. 15/142,831 Final Office Action dated Apr. 7, 2017.
U.S. Appl. No. 15/142,410 Final Office Action dated Jan. 27, 2017.
U.S. Appl. No. 15/142,819 Office Action dated Sep. 20, 2017.
U.S. Appl. No. 15/142,819 Final Office Action dated Jun. 2, 2017.
U.S. Appl. No. 15/142,410 Office Action dated May 18, 2017.
U.S. Appl. No. 15/142,095 Final Office Action dated May 17, 2017.
U.S. Appl. No. 15/143,192 Final Office Action dated May 30, 2017.
U.S. Appl. No. 15/142,401 Final Office Action dated Nov. 16, 2017.
U.S. Appl. No. 15/143,192 Office Action dated Jan. 11, 2018.
U.S. Appl. No. 15/142,819 Final Office Action dated Apr. 27, 2018.

* cited by examiner

SELF-PUBLISHING WORKFLOW

BACKGROUND OF THE INVENTION

1. Field of Invention

The present invention generally concern self-publishing. More specifically, the present invention concern platforms for self-publishing authors to connect to, vet, hire, and communicate with professional service providers.

2. Description of the Related Art

Traditionally, an author wanting his/her book to be published and sold had to be selected by a publisher for publication. Generally, an editor would be hired during the process to proofread and edit the book before it is published and sold to the public as a finished book. The publisher typically hires skilled editors, marketers, cover designers, and other professional service providers to prepare the manuscripts it intends to publish prior to their publication as books.

More recently, self-publishing has risen in popularity, with the advent of websites that allow an author to upload a manuscript and immediately publish a book. However, such self-publishing authors typically do not have access to the same type of professional service providers (e.g., editors, marketers, cover designers) that a publisher has access to, which may ultimately limit the a self-published book's chances at success.

Furthermore it can be difficult and complicated hiring multiple types of professionals, as scheduling between multiple appointments can be difficult, and keeping track of stages in each working relationship (e.g., whether an agreement/contract has been prepared/signed, whether special requirements have been imposed by either party, whether a particular project is complete or in progress).

Thus, there is a need for a network-based platform for self-publishing authors to connect to, vet, hire, and communicate with professional service providers.

SUMMARY OF THE PRESENTLY CLAIMED INVENTION

A first claimed embodiment of the present invention concerns a method for providing services for self-publishing authors that includes receiving an author profile from an author device, the author profile identifying a user account of an author. The method also includes receiving a manuscript from the author device, the manuscript associated with the author. The method also includes transmitting a service provider list to the author device, the service provider list identifying a plurality of service providers. The method also includes receiving a service provider selection from the author device, the service provider selection identifying a selected service provider from the service provider list. The method also includes generating an agreement between the author and the selected service provider. The method also includes transmitting the agreement to both the author device and a selected service provider device associated with the selected service provider. The method also includes receiving an author signature from the author device and a selected service provider signature from the selected service provider device. The method also includes transmitting at least a subset of the manuscript to the selected service provider device.

A second claimed embodiment of the present invention concerns a system for crowd-based manuscript editing that includes a communication transceiver that is communicatively coupled at least to an author device and to a plurality of service provider devices associated with a plurality of service providers. The communication transceiver receives an author profile and a manuscript from the author device, the author profile identifying a user account of an author, the manuscript associated with the author. The system also includes a memory and a processor coupled to the memory and to the communication transciever. Execution of instructions stored in the memory by the processor performs various system operations. The system operations include triggering transmission of a service provider list to the author device via the communication transciever, the service provider list identifying a plurality of service providers. The system operations also include receiving a service provider selection from the author device via the communication transciever, the service provider selection identifying a selected service provider from the service provider list. The system operations also include generating an agreement between the author and the selected service provider. The system operations also include triggering transmission of the agreement to both the author device and a selected service provider device associated with the selected service provider. The system operations also include receiving an author signature from the author device and a selected service provider signature from the selected service provider device. The system operations also include triggering transmission of at least a subset of the manuscript to the selected service provider device.

A third claimed embodiment of the present invention concerns a non-transitory computer-readable storage medium, the non-transitory computer-readable storage medium having embodied thereon a program executable by a processor to perform an exemplary program method for providing services for self-publishing authors that includes receiving an author profile from an author device, the author profile identifying a user account of an author. The method also includes receiving a manuscript from the author device, the manuscript associated with the author. The method also includes transmitting a service provider list to the author device, the service provider list identifying a plurality of service providers. The method also includes receiving a service provider selection from the author device, the service provider selection identifying a selected service provider from the service provider list. The method also includes generating an agreement between the author and the selected service provider. The method also includes transmitting the agreement to both the author device and a selected service provider device associated with the selected service provider. The method also includes receiving an author signature from the author device and a selected service provider signature from the selected service provider device. The method also includes transmitting at least a subset of the manuscript to the selected service provider device.

DETAILED DESCRIPTION

An author using an author device may connect to a publishing network, which in turn may be connected to a number of service provider networks that provide services relating to publishing workflow (e.g., editing, typography, historical research, cover designing) and business (e.g., marketing, promotion, author events). The publishing network may provide a network portal for the author and network portals for various service providers, with graphical user interfaces for both the author and the service providers. The author can then select specific service providers based on ratings, posted service rates, special requirements such as time scheduling and genre specialization, and can hire those service providers to work with the author's on or with the author's manuscript through the publishing network. The publishing network may then generate an agreement and track its signing as well as other milestones in the working relationship.

Figure 1:
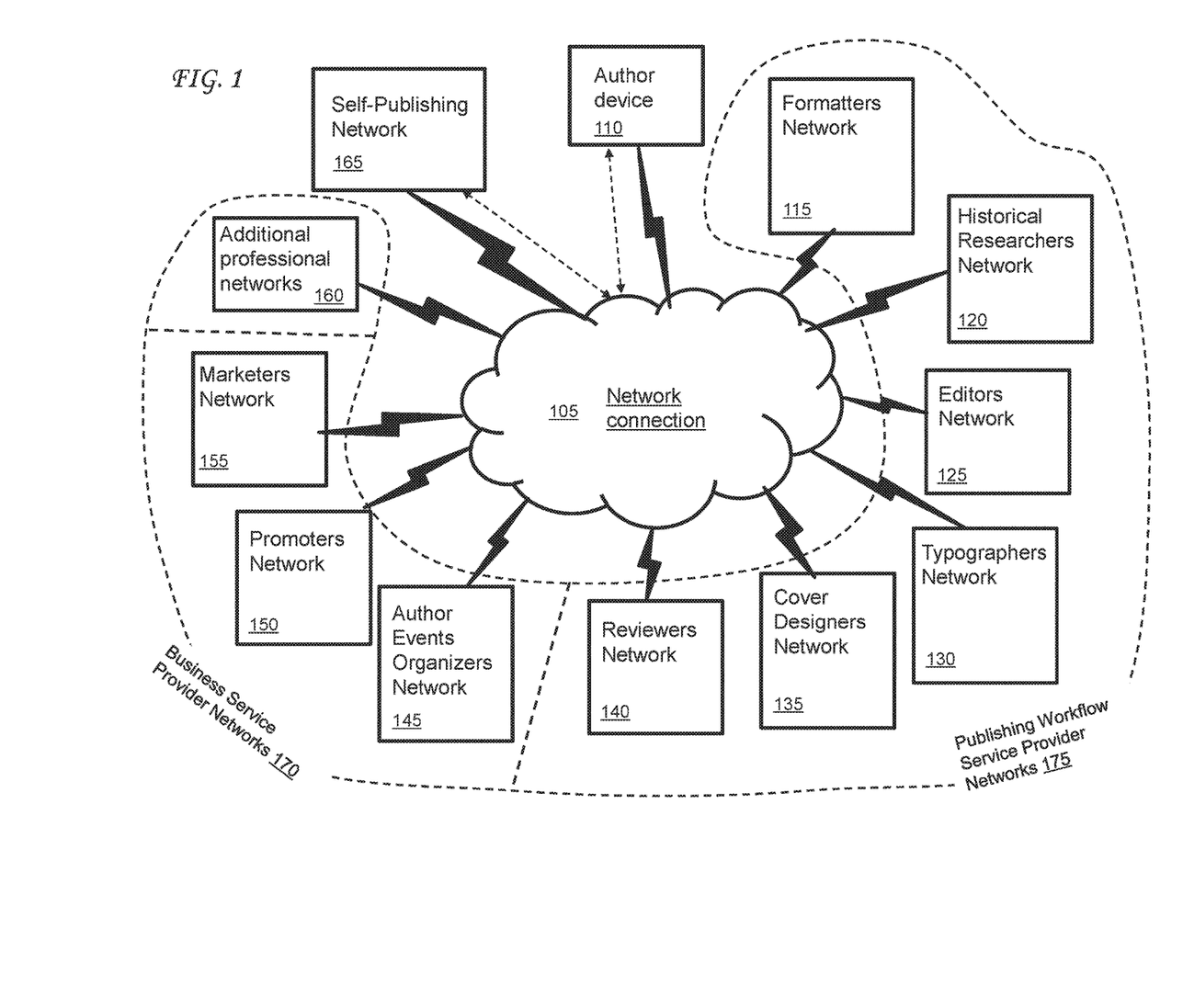
FIG. 1 illustrates an exemplary self-publishing network ecosystem.

FIG. 1 illustrates an exemplary self-publishing network ecosystem.

The self-publishing network ecosystem of FIG. 1 includes a self-publishing network 165 that is communicatively coupled to at least one author device 110 and a variety of business service provider networks 170 and publishing workflow service provider networks 175 via a network connection 105. The network connection 105 may be include a connection through a private network, such as a local area network (LAN), a wireless local area network (WLAN), a municipal area network (MAN), a wide area network (WAN), or some combination thereof. The network connection 105 may also include a connection through the public Internet.

The self-publishing network 165, as well as each network of the publishing workflow service provider networks 175 and business service provider networks 170, may include one or more server(s) (not pictured). Each of these which may each be some variety of computer system 800 or may include at least a subset of the hardware components and software elements identified in FIG. 8. The server(s) may, for example, include some kind of memory or data storage (e.g. memory 820, mass storage 830, portable storage 840, or some combination thereof), some kind of processor (e.g. processor 810), some kind of input mechanism(s) (e.g. one or more of the identified input devices 860), and some kind of display system (e.g., display system 870). The self-publishing network 165 is illustrated in further detail in FIG. 2.

The author device 110 uses the self-publishing network 165 as an intermediary to interact with the publishing workflow service provider networks 175 and business service provider networks 170. The publishing workflow service provider networks 175 and business service provider networks 170 are networks of third party professionals. The author device 110 may, for example, provide a manuscript to the publishing workflow service provider networks 175 or business service provider networks 170 via the self-publishing network 165.

The author's manuscript may include text as well as images and other rich media content. Rich media, as used in the present disclosure, refers to content that may include not only text (i.e. words) or images (i.e. pictures) to convey information to the user, but may also include or utilize a variety of advanced features such as video and audio that encourages viewers to interact and engage with the content being viewed. The manuscript content and the various interfaces discussed herein may include a variety of rich media, as well as traditional text or image content.

The publishing workflow service provider networks 175 are a category of service provider networks that can help the author create and edit the book, article, or other manuscript that the author intends to self-publish. The publishing workflow service provider networks 175 may include, for example, a formatters network 115, a historical researchers network 120, an editors network 125, a typographers network 130, a cover designers network 135, and a reviewers network 140. Additional publishing workflow service provider networks 175 (not pictured) may, for example, include illustrator networks, colorist networks, type designer networks, copy editor networks, and proofreader networks.

The business service provider networks 170 are a category of service provider networks that can help the author in ways other than helping to create and edit, such as by helping to promote, market, or organize events associated with the book, article, or other manuscript that the author intends to self-publish. The business service provider networks 170 may include, for example, an author events organizer network 145, a promoters network 150, and a marketers network 155.

Additional professional networks 160 (e.g., of the publishing workflow service provider networks 175 category, of the business service provider networks 170 category, or of another category) may also be connected to the self-publishing network 165 and/or author device 110 via the network connection 110.

Figure 2:
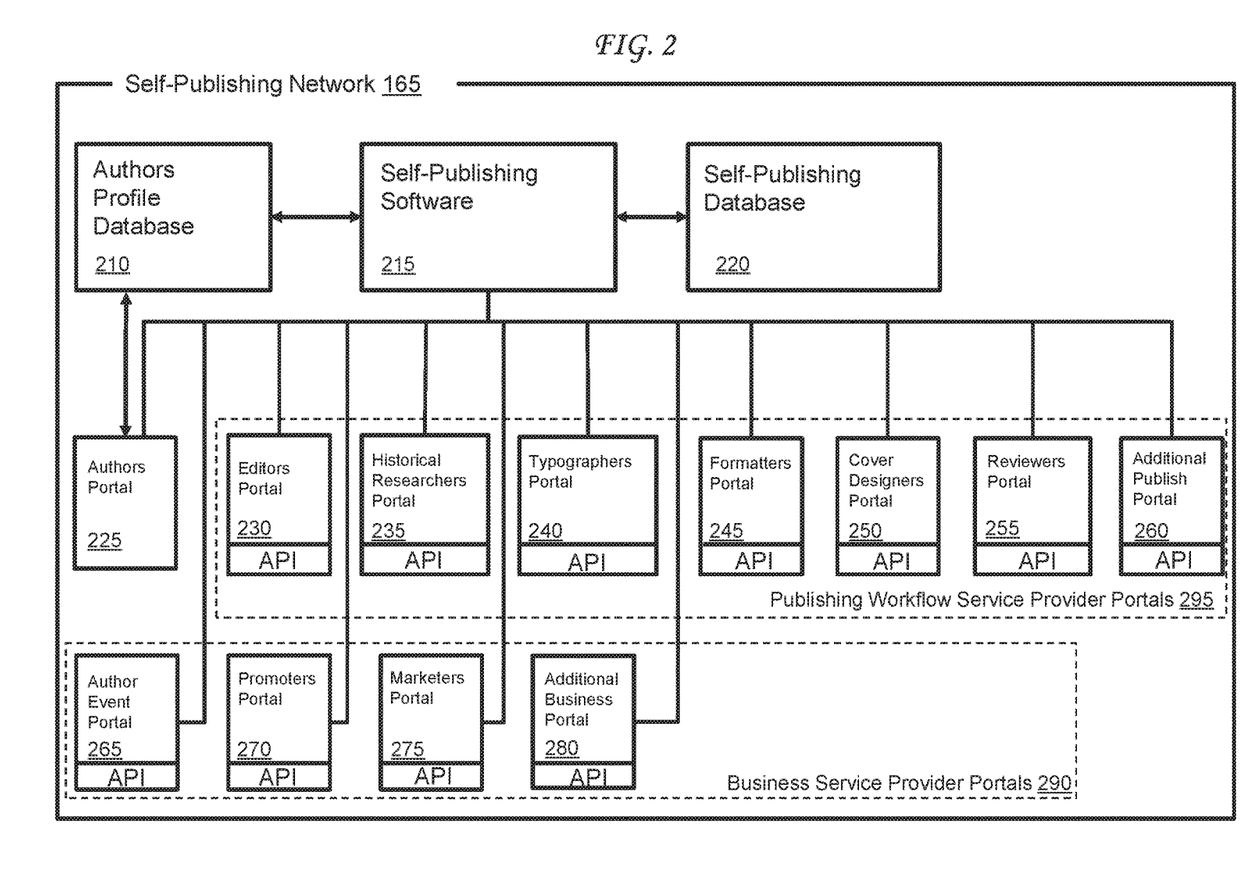
FIG. 2 illustrates a self-publishing network.

FIG. 2 illustrates a self-publishing network.

The self-publishing network 165 may include a variety of hardware components (e.g., included within or coupled to one or more of the servers), a variety of stored data (e.g., stored in one or more memory or data storage elements of one or more of the servers), and a variety of software elements (e.g., executed by one or more processors of one or more of the servers).

The self-publishing network 165 of FIG. 2 includes an authors profile database 210 which may include profile information of a number of authors using the self-publishing network 165. For example, the authors profile database 210 could store biographical information, photos, past unpublished manuscripts, past published works, writing samples, reviews (e.g. of an author's writing as well as timeliness of payment and responsiveness to service providers), service provider history (e.g., identifying which service providers, or which types of service providers, an author has used in the past), financial information (e.g., credit score, validation by a financial entity that the author is able to pay, and/or payment information such as credit-card/debit-card/bank-account/e-payment-account information that is stored but concealed from public view), or some combination thereof.

The publishing network 165 of FIG. 2 also includes an authors portal 225 and number of portals for various service providers, categorizes as either publishing workflow service provider portals 295 (e.g., if related to publishing workflow service provider networks 175) or business service provider portals 290 (e.g., if related to business service provider networks 170). Each portal may each be an interactive portal, such as an Internet-accessible website, an intranet-accessible network page, or a software application associated with the self-publishing network 165. Each portal may use an Application Programming Interface (API) associated with the self-publishing network 165.

The publishing workflow service provider portals 295 of FIG. 2 include the editors portal 230, the historical researchers portal 235, the typographers portal 240, the formatters portal 245, the cover designers portal 250, the reviewers portal 255, and an "additional" publishing portal 260. The business service provider portals 290 of FIG. 2 include the author event organizer portal 265, the promoters portal 270, the marketers portal 275, and an "additional" business portal 280. In other embodiments of the self-publishing network 165, other service provider portals could also be included. Each of these can receive data from the self-publishing software 215, and transmit data to the self-publishing software 215, using an Application Programming Interface (API).

The authors portal 225 of FIG. 2 may be accessed by the author device 110 and may give an author the ability to vet various service provider networks (e.g., the business service provider networks 170 and publishing workflow service provider networks 175 of FIG. 1), connect with them, order their services, manage agreements and contracts, communicate with them, and finally rate/review the provided services after they have been performed. The authors portal 225 may also allow the author to manage his/her working relationships with these service provider networks and manage his/her schedules associated with publishing, business, and work with various service provider networks. The authors portal 225 may also allow the author to manage versions of his/her work and finally publish his/her work once he/she is ready to do so. The authors portal 225 may also allow the author to adjust at least a subset of his/her profile information.

Each service provider portal of the various service provider portals of FIG. 2 may include GUIs both for authors and for the service provider in question. An author GUI (see, e.g., author GUI 410 of FIG. 4A or author GUI 510 of FIG. 5A) may be accessed by an author using an author device 110 to vet, connect with, order services, manage agreements/contract, communicate, and rate/review that particular service provider network. A service provider GUI (see, e.g., provider GUI 450 of FIG. 4B or provider GUI 545 of FIG. 5B) can allow a service provider to contact authors and offer/bid to perform services they request, communicate with authors, to manage versions of the authors' works, manage billing authors, manage scheduling services to perform for various authors, and rate/review authors (e.g., based on their written work and/or based on professionalism and/or based on responsiveness and/or based on ease of cooperative work and/or based on ability to pay service providers fully and on time).

Figure 6:
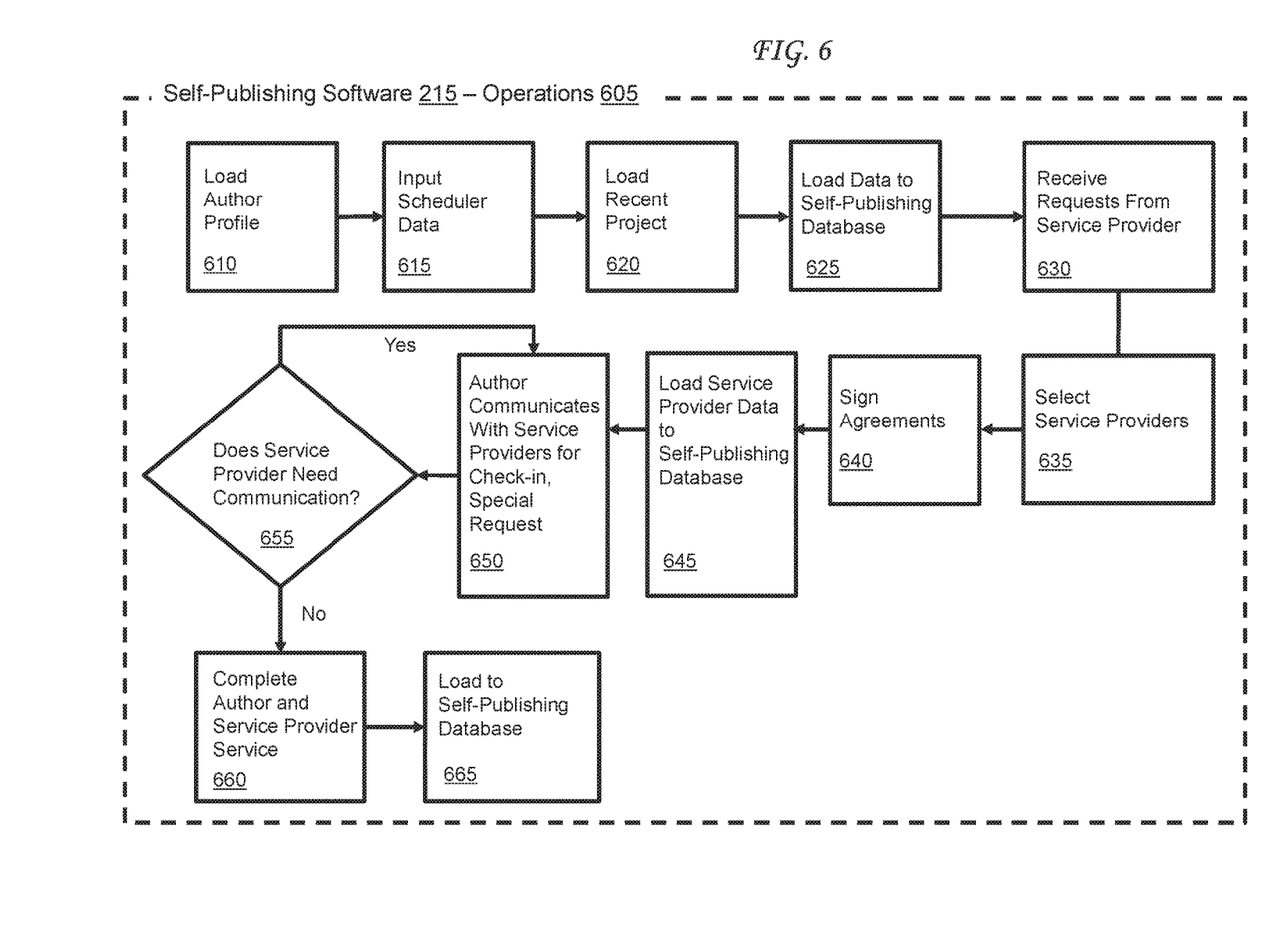
FIG. 6 is a flow chart illustrating exemplary operations of exemplary self-publishing software.

The publishing network 165 of FIG. 2 also includes a self-publishing software 215, which allows interaction between the authors portal 225 and the various service provider portals (e.g., including the publishing workflow service provider portals 295 and business service provider portals 290 and any other service provider portals). Exemplary operations 605 of the self-publishing software 215 are illustrated in FIG. 6. The self-publishing software 215 may also store data pertaining to the interactions between an author and the various service provider networks.

The self-publishing software 215 may provide data to a self-publishing database 220 (e.g., data pertaining to the interactions between one or more authors and the various service provider networks) and/or retrieve data from the self-publishing database 220. The self-publishing software 215 may also provide data to the authors profile database 210 (e.g., data pertaining to the interactions between a particular author and the various service provider networks) and/or retrieve data from the authors profile database 210. The authors profile database 210 may also retrieve data from the authors portal 225 (e.g., author profile information entered through a GUI by an author) or provide data to the authors portal 225 (e.g., data that an author has already previously provided so that it does not need to be entered twice, or data about the author's interactions with the various service providers).

Figure 3:
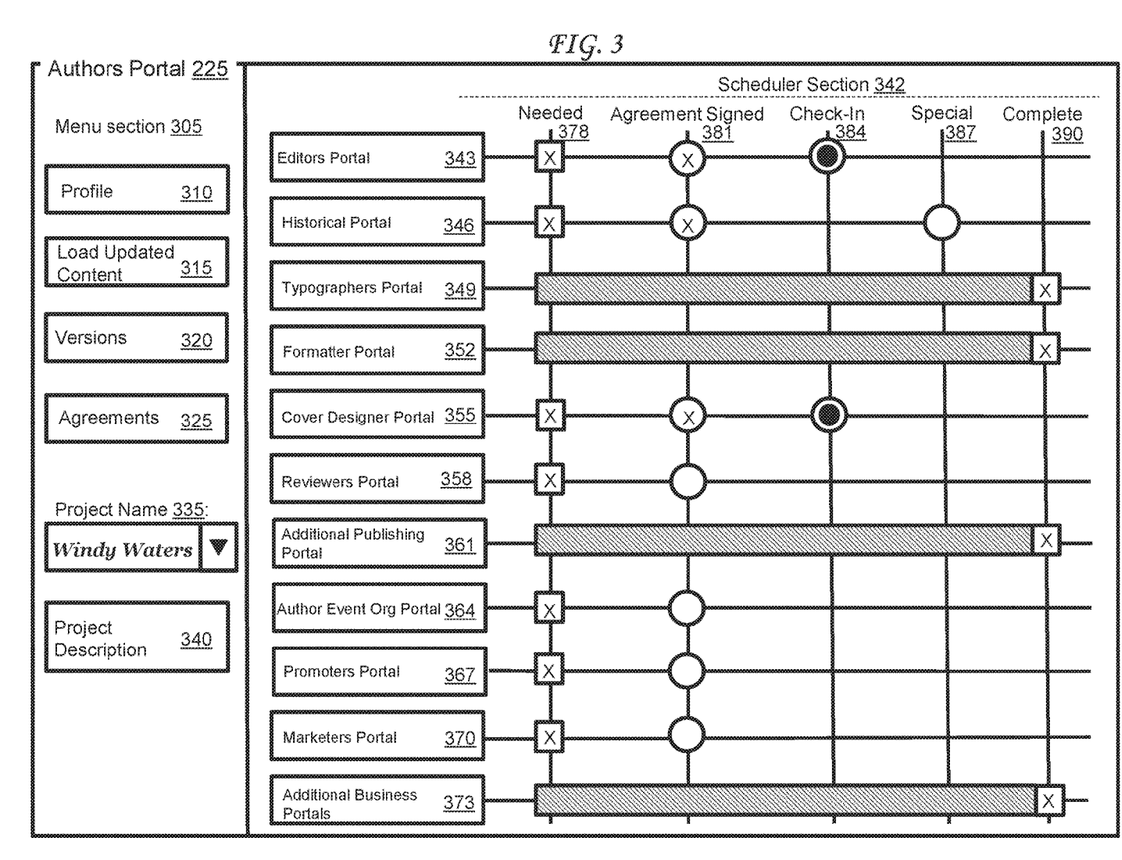
FIG. 3 illustrates a graphical user interface of an exemplary authors portal.

FIG. 3 illustrates a graphical user interface of an exemplary authors portal.

The exemplary authors portal 205 includes a menu section 305 and a scheduler section 342. The menu section includes a "project name" identifier 335, which identifies the name of a project about which the author is currently viewing information (e.g., "Windy Waters" in FIG. 3). The "project name" identifier 335 may also include an input element, such as a text box or dropdown menu, that allows the author to switch over and view other projects (e.g., other books/articles/manuscripts) that the author is working on or has worked on in the past.

The menu section 305 also allows the author to access and edit his/her author profile using the "profile" button 310. The menu section 305 allows the author to upload a new manuscript or a new manuscript version (e.g., related to the project identified by the project identifier 335) via the "load updated content" button 315. The menu section 305 allows the author to view a historical GUI (not shown) of different versions of a manuscript (e.g., related to the project identified by the project identifier 335), and to revert the manuscripts to any of its past versions, using the "versions" button 320. The menu section 305 also allows authors to view any agreements or contracts with service provider networks (e.g., business service provider networks 170 and/or publishing workflow service provider networks 175) via an "agreements" button 325 (e.g., and an associated agreement list GUI and agreement viewer GUI, not shown).

The scheduler section 342 of the authors portal 225 includes various identifier entries (e.g., portrayed as rows in FIG. 3) associated with the different service provider portals/networks, and various scheduling categories (e.g., portrayed as columns in FIG. 3) identifying various scheduled events within a working relationship between an author and a service provider.

For example, the identifier entries of the scheduler section 342 include an editors portal entry 343 corresponding to the editors portal 230, a historical researchers portal entry 346 corresponding to the historical researchers portal 235, a typographers portal entry 349 corresponding to the typographers portal 240, a formatters portal entry 352 corresponding to the formatters portal 245, a cover designers portal entry 355 corresponding to the cover designers portal 250, reviewers portal entry 358 corresponding to the reviewers portal 255, an "additional publishing" portal entry 361 corresponding to the "additional publishing" portal 260, an author event organizer portal entry 364 corresponding to the author event organizer portal 265, a promoters portal entry 367 corresponding to the promoters portal 270, a marketers portal entry 370 corresponding to the marketers portal 275, and an "additional business" portal entry 373 corresponding to the "additional business" portal 280.

The various scheduling categories of the scheduler section 342 include a "needed" column 378 identifying whether the author has indicated that the service provider network's services are needed. The scheduling categories also includes an "agreement signed" column 381 identifying whether or not an agreement or contract has been written, has been transmitted to the author and/or the service provider network, has been received by the author and/or the service provider network, or has been signed by the author and/or the service provider network. The signatures of the author and the service provider network may be image-based, and may be checked for validity against a database of valid signature images. The signatures may also each include a digital certificate that may then be checked for validity against a certificate authority.

The scheduling categories also includes a "check-in" column 384 identifying whether or not a line of communication has been established. In some cases, an indicator on the "check-in" column 384 may blink to indicate the presence of a communication that has not yet been read by the author, or a communication that requires the author's attention or response. The scheduling categories also includes a "special" column 387 identifying whether any special requests are present. For example, such special requests may include special requests from the author or the service provider network. An service provider network may request that files be transmitted by the author to the service provider network in a specific format, or that payments should be made by the author to the service provider network using a certain payment method (e.g., credit card, debit card, bank wire transfer, e-payment account, check/cash). The author may request that the service provider network transmit files to the author in a specific format, illustrate a cover using a particular style, or format the text a particular way. The scheduling categories also includes a "complete" column 390 identifying whether or not the work that was to be performed by a particular service provider has been completed. An indicator in the "complete" column 390 may optionally automatically "mark" the remaining columns as pictured in FIG. 2. An indicator under any of the columns in the scheduler section 342 may be marked by the author or by the particular service provider network corresponding to the identifier entry (e.g., row of the scheduler section 342 as pictured in FIG. 2) in question.

Figure 4A:
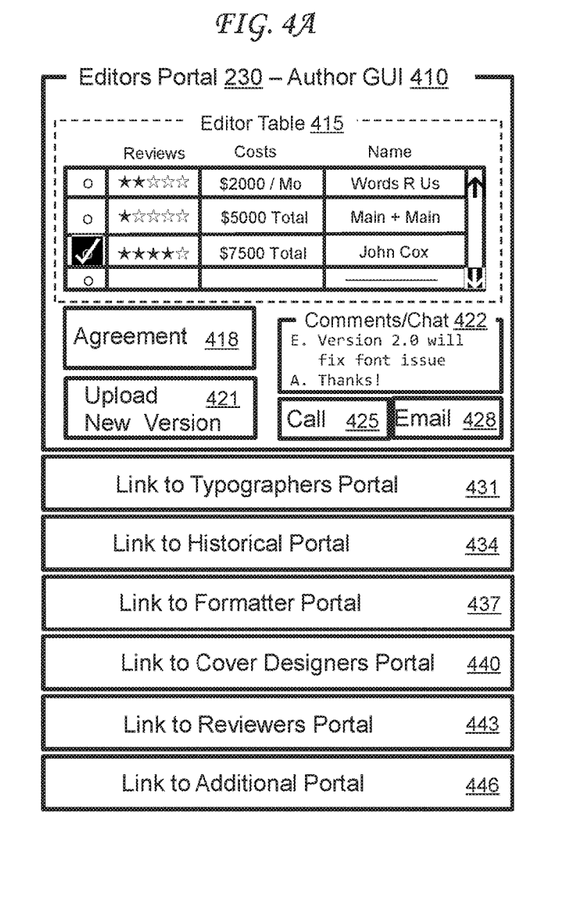
FIG. 4A illustrates an author graphical user interface of an exemplary editors portal.

FIG. 4A illustrates an author graphical user interface of an exemplary editors portal.

The author GUI 410 of the editors portal 230 includes various elements allowing an author to select and interact with an editors network 125. In particular, the author GUI 410 of FIG. 4A includes an editor table 415 that identifies names of different editors or editor networks 125 (e.g., "Words R Us", "Main+Main", or "John Cox") that the author can hire, as well as rates/costs and ratings/reviews. In some embodiments, the editor table 415 may be narrowed based on special requirements of the author that may be input into a special requirements GUI (not pictured), such as a set of radio buttons or checkboxes or a set of type-input fields. For example, the editor table 415 may be automatically narrowed based on time requirements (e.g., work needs to be performed by a certain time or within a certain time period), financial requirements (e.g., work needs to be performed within a certain budget), market requirements (e.g., service provider should be familiar with working on children's books, or young-adult books, or fantasy books, or science fiction books, or another specific market), personal requirements (e.g., service provider must be familiar with the author's family), or other requirements. Some special requirements may be imposed automatically by the self-publishing software 215, such as existing conflicts (e.g., service provider A and B can only meet with the author during the same time slot and one has already been booked during that time slot).

An "agreement" button 418 can allow the author to read and/or sign an agreement/contract with a particular editor or editor network 125. An "upload new version" button 421 allows an author to upload an edited version of the project to the editors portal 230 and/or to the self-publishing network 165 from the author device 110. The upload new version" button 421 may also allow the user to download the edited version of the project to the author device 110 from the editors portal 230 or the self-publishing network 165.

A comments/chat interface 422 may allow for text-based communication between the editor network 125 and the author device 110. Likewise, a "call" button 425 may allow for a telephonic connection, or a voice-over-internet-protocol (VOIP) audio call connection, or an audiovisual call connection (e.g., Skype, Facetime Google Hangouts, Cisco) to connect the author device 110 to the editor network 125 that was selected/hired by the author (e.g., call a particular editor individual at the editor network 125). Finally, an "email" button may allow the author device 110 to send an email to the editor network 125 that was hired by the author (e.g., email a particular editor individual at the editor network 125).

The author GUI 410 of the editors portal 230 may also include links to other author GUIs of other publishing workflow service provider portals 295, such as portals associated with the publishing workflow service provider networks 175. For example, the author GUI 410 may include a link 431 to a typographers portal 240, a link 434 to a historical portal 235, a link 437 to a formatter portal 245, a link 440 to a cover designers portal 250, a link 443 to a reviewers portal 255, and a link 446 to an additional publishing workflow service provider portal 260. In some cases the author GUI 410 of the editors portal 230 may also include links (not shown) to business service provider portals 290.

Figure 4B:
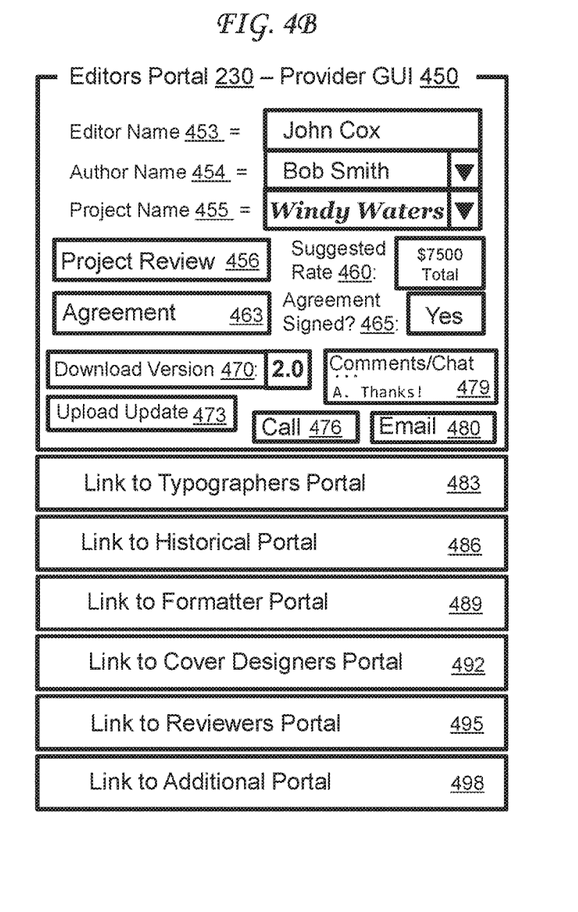
FIG. 4B illustrates a service provider graphical user interface of an exemplary editors portal.

FIG. 4B illustrates a service provider graphical user interface of an exemplary editors portal.

The service provider GUI 450 of the editors portal 230 illustrated in FIG. 4B includes various elements allowing an editors network 125 to interact with an author on whose project they are working on. An "editor name" field 453 identifies the editor or editor network 125 that is currently logged in (e.g., "John Cox"). An "author name" field 454 identifies an author (e.g., "Bob Smith") whose work is being edited by the editor or editor network 125 identified in the editor name field 453. A GUI element, such as a drop-down menu and/or a search box and/or a text input field, may be used to change the author name field 454 to select another author whose work the identified editor or editor network 125 is editing. A "project name" field 455 identifies a project (e.g., "Windy Waters") that is being edited by the editor or editor network 125 identified in the editor name field 453 and that is written by the author identified in author name field 454. A GUI element, such as a drop-down menu and/or a search box and/or a text input field, may be used to change the project name field 455 to select another project that the identified editor or editor network 125 is editing.

A "project review" button 456 may appear early on in the GUI 450 to allow the editor to review the project before agreeing to work on it, and may remain later so that the editor can recall specifications regarding what the author initially asked for. A suggested rate field 460 may allow the editor/editor network 125 to edit and display a suggested rate (e.g., $7500 total per project) to the author before an agreement is reached If there is an agreement or contract, the agreement/contract may be read and signed via an "agreement" button 463. The GUI 450 then displays whether or not an agreement/contract has been signed by one or both parties at a signing indicator 465.

The GUI 450 also allows the editor network 125 to download a latest version, or an earlier version, using the download version button 470, which may further include an editable field (e.g., using a text input field or a dropdown menu) allowing the editor to indicate which version should be downloaded to the editor network 125. An "upload update" button 473 allows an editor network 125 to upload an updated version to the editors portal 230 and/or self-publishing network 165 and/or author device 110 after edits have been made.

A comments/chat interface 479 similar to the comments/chat interface 422 of FIG. 4A may allow for text-based communication between the editor network 125 and the author device 110. Likewise, a "call" button 476 may allow for a telephonic connection, or a voice-over-internet-protocol (VOIP) audio call connection, or an audiovisual call connection (e.g., Skype, Facetime Google Hangouts, Cisco) to connect the editor network 125 to the author device 110 corresponding to the author identified in the author name field 454. Finally, an "email" button may allow the editor network 125 to send an email to the author device 110 identified in the author name field 454.

The service provider GUI 450 of the editors portal 230 may also include links to other service provider GUIs of other publishing workflow service provider portals 295, such as portals associated with the publishing workflow service provider networks 175. For example, the service provider GUI 450 may include a link 483 to a typographers portal 240, a link 486 to a historical portal 235, a link 489 to a formatter portal 245, a link 492 to a cover designers portal 250, a link 495 to a reviewers portal 255, and a link 498 to an additional publishing workflow service provider portal 260. In some cases the author GUI 410 of the editors portal 230 may also include links (not shown) to business service provider portals 290.

Figure 5A:
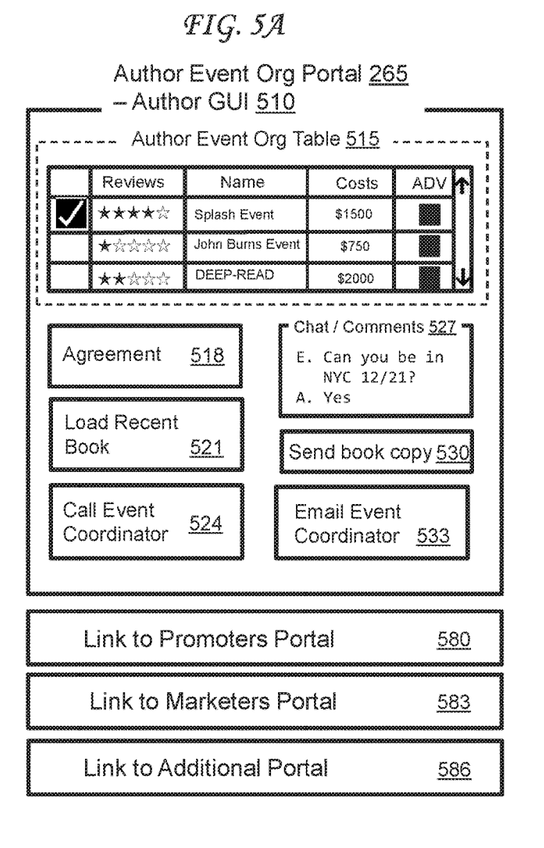
FIG. 5A illustrates an author graphical user interface of an exemplary author event organizer portal.

FIG. 5A illustrates an author graphical user interface of an exemplary author event organizer portal.

The author GUI 510 of the author event organizer portal 265 of FIG. 5A includes various elements allowing an author to select and interact with an author event organizer network 145. In particular, the author GUI 510 of FIG. 5A includes an author event organizer table 515 that identifies names of different author event organizers or author event organizer networks 145 (e.g., "Splash Event", "John Burns Event", or "DEEP-READ") that the author can hire, as well as rates/costs and ratings/reviews. In some embodiments, the author event organizer table 515 may be narrowed based on special requirements of the author that may be input into a special requirements GUI (not pictured), such as a set of radio buttons or checkboxes or a set of type-input fields. For example, the author event organizer table 515 may be automatically narrowed based on time requirements (e.g., work needs to be performed by a certain time or within a certain time period), financial requirements (e.g., work needs to be performed within a certain budget), market requirements (e.g., service provider should be familiar with working on children's books, or young-adult books, or fantasy books, or science fiction books, or another specific market), personal requirements (e.g., service provider must be familiar with the author's family), or other requirements. Some special requirements may be imposed automatically by the self-publishing software 215, such as existing conflicts (e.g., service provider A and B can only meet with the author during the same time slot and one has already been booked during that time slot).

An "agreement" button 518 can allow the author to read and/or sign an agreement/contract with a particular author event organizer or author event organizer network 145. The author GUI 510 of the author event organizer portal 265 includes a "load recent book" button, which may be used by the author to load a recent book that the author wishes to have events for. A "send book copy" button 530 may send the author event organizer network 145 a copy of the book (e.g., an electronic copy such as an e-book or alternately a physical copy).

A comments/chat interface 527 may allow for text-based communication between the author event organizer network 145 and the author device 110. Likewise, a "call event coordinator" button 524 may allow for a telephonic connection, or a voice-over-internet-protocol (VOIP) audio call connection, or an audiovisual call connection (e.g., Skype, Facetime Google Hangouts, Cisco) to connect the author device 110 to the author event organizer network 145 that was selected/hired by the author (e.g., call a particular event coordinator individual at the author event organizer network 145). Finally, an "email event coordinator" button may allow the author device 110 to send an email to the author event organizer network 145 that was hired by the author (e.g., email a particular event coordinator individual at the author event organizer network 145).

The author GUI 510 of the author event organizer portal 265 may also include links to other author GUIs of other business service provider portals 290, such as portals associated with the business service provider networks 170. For example, the author GUI 510 may include a link 580 to a promoters portal 270, a link 583 to a marketers portal 275, and a link 586 to an additional business service provider portal 280. In some cases the author GUI 510 of the author event organizer portal 265 may also include links (not shown) to publishing workflow service provider portals 295.

Figure 5B:
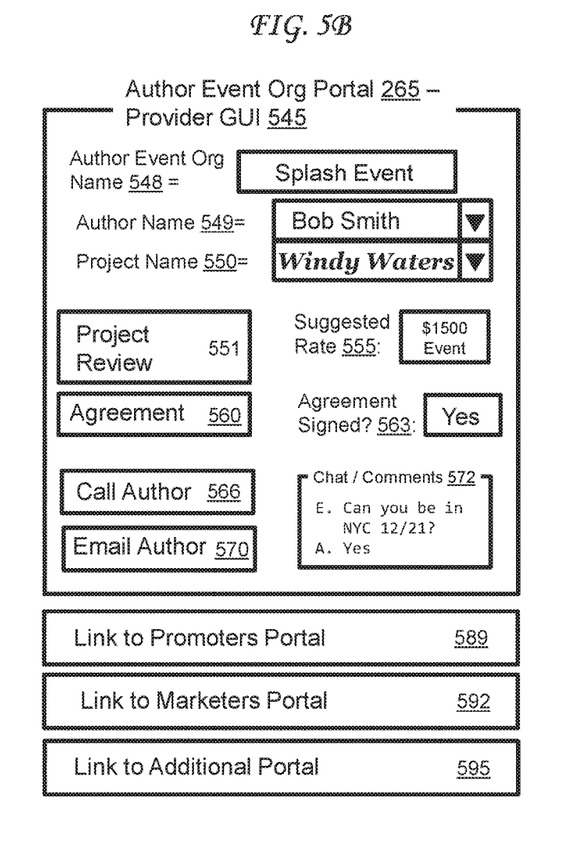
FIG. 5B illustrates an service provider graphical user interface of an exemplary author event organizer portal.

FIG. 5B illustrates a service provider graphical user interface of an exemplary author event organizer portal.

The service provider GUI 545 of the author event organizer portal 265 illustrated in FIG. 5B includes various elements allowing an author event organizer network 145 to interact with an author on whose project they are working on. An "author event organizer name" field 548 identifies the author event organizer or author event organizer network 145 that is currently logged in (e.g., "Splash Event"). An "author name" field 549 identifies an author (e.g., "Bob Smith") whose work is being edited by the author event organizer or author event organizer network 145 identified in the author event organizer name field 548. A GUI element, such as a drop-down menu and/or a search box and/or a text input field, may be used to change the author name field 549 to select another author whose work the identified author event organizer or author event organizer network 145 is organizing events for. A "project name" field 550 identifies a project (e.g., "Windy Waters") that is being event-managed by the author event organizer or author event organizer network 145 identified in the author event organizer name field 548 and that is written by the author identified in author name field 549. A GUI element, such as a drop-down menu and/or a search box and/or a text input field, may be used to change the project name field 550 to select another project that the identified author event organizer or author event organizer network 145 is organizing events for.

A "project review" button 551 may appear early on in the GUI 545 to allow the author event organizer to review the project before agreeing to work on it, and may remain later so that the author event organizer can recall specifications regarding what the author initially asked for. A suggested rate field 555 may allow the author event organizer/author event organizer network 145 to edit and display a suggested rate (e.g., $1500 total per event) to the author before an agreement is reached If there is an agreement or contract, the agreement/contract may be read and signed via an "agreement" button 560. The GUI 545 then displays whether or not an agreement/contract has been signed by one or both parties at a signing indicator 563.

A comments/chat interface 572 similar to the comments/chat interface 527 of FIG. 5A may allow for text-based communication between the author event organizer network 145 and the author device 110. Likewise, a "call author" button 566 may allow for a telephonic connection, or a voice-over-internet-protocol (VOIP) audio call connection, or an audiovisual call connection (e.g., Skype, Facetime Google Hangouts, Cisco) to connect the author event organizer network 145 to the author device 110 corresponding to the author identified in the author name field 549. Finally, an "email" button may allow the author event organizer network 145 to send an email to the author device 110 identified in the author name field 549.

The service provider GUI 545 of the author event organizer portal 265 may also include links to other service provider GUIs of other publishing workflow service provider portals 295, such as portals associated with the publishing workflow service provider networks 175. For example, the service provider GUI 545 may include a link 483 to a typographers portal 240, a link 486 to a historical portal 235, a link 489 to a formatter portal 245, a link 492 to a cover designers portal 250, a link 495 to a reviewers portal 255, and a link 498 to an additional publishing workflow service provider portal 260. In some cases the author GUI 410 of the author event organizer portal 265 may also include links (not shown) to business service provider portals 290.

The author GUI 510 of the author event organizer portal 265 may also include links to other author GUIs of other business service provider portals 290, such as portals associated with the business service provider networks 170. For example, the author GUI 510 may include a link 589 to a promoters portal 270, a link 592 to a marketers portal 275, and a link 595 to an additional business service provider portal 280. In some cases the author GUI 510 of the author event organizer portal 265 may also include links (not shown) to publishing workflow service provider portals 295.

In some embodiments, the service provider may be able to influence the author's publication date, or the manuscript before the manuscript has been written. For example, a promoter working with a promoter network 150 may be able to identify for that author that early June is a good time to publish his/her book (e.g., in time for school graduations and Father's day celebrations), and the scheduled publication date may be automatically changed by the self-publishing software 215 if the author agrees.

Similarly, a promoter working with a promoter network 150 may be able to identify for that author that there is an oversaturation of books in a particular genre (e.g., romance novels) and suggest a different genre for the author to write in (e.g., mystery books). Therefore, the self-publishing network 165 may be used by aspiring authors before a single word of a manuscript has been written, who may benefit from the advice of promoters, marketers, and other professionals familiar with the publishing industry.

FIG. 6 is a flow chart illustrating exemplary operations of exemplary self-publishing software. The exemplary operations 605 of the self-publishing software 215 include a number of steps performed by the self-publishing network 165.

At step 610, the operations 605 include loading an author profile (e.g., from the author profile database 210). At step 615, scheduler data is input from the scheduler section 342 of the authors portal 225. At step 620, a recent project by an author is loaded from the authors portal 225 (e.g., using "Load Updated Content" button 315 of FIG. 3). At step 625, all of this data is loaded into the self-publishing database 220.

At step 630, the self-publishing network 165 receives requests from one or more service provider networks (e.g., to work with authors, to establish their rates). At step 635, the self-publishing network 165 receives a selection of a particular service provider network from an author. At step 640, an agreement or contract may be signed between the author and the selected service provider network via the self-publishing software 215 (e.g., via the author portal 225 and service provider portal associated with the selected service provider network). At step 645, data regarding the service provider and the agreement is loaded into the self-publishing database 220. At step 650, the author communicates check-in information and special request information from the author device 110 to the selected service provider network using the author portal 225 (e.g., as in FIG. 2) and author GUIs of service provider portals (e.g., author GUI 410 of FIG. 4A and/or author GUI 510 of FIG. 5A). If the service provider wishes to communicate at step 655, it may similarly do so, for example using the service provider GUIs of the service provider portals (e.g., service provider GUI 450 of FIG. 4B and/or service provider GUI 545 of FIG. 5B).

Once communications are finished between the author device 110 and the selected service provider network at step 655, the service is completed by the selected service provider and the completion is communicated at step 660. At step 665, the completion status of the service is identified in the self-publishing database 220, and information about the service completed (e.g., edits made by an editor, a cover designed or illustrated by a cover designer) may also be stored in the self-publishing database 220.

Figure 7:
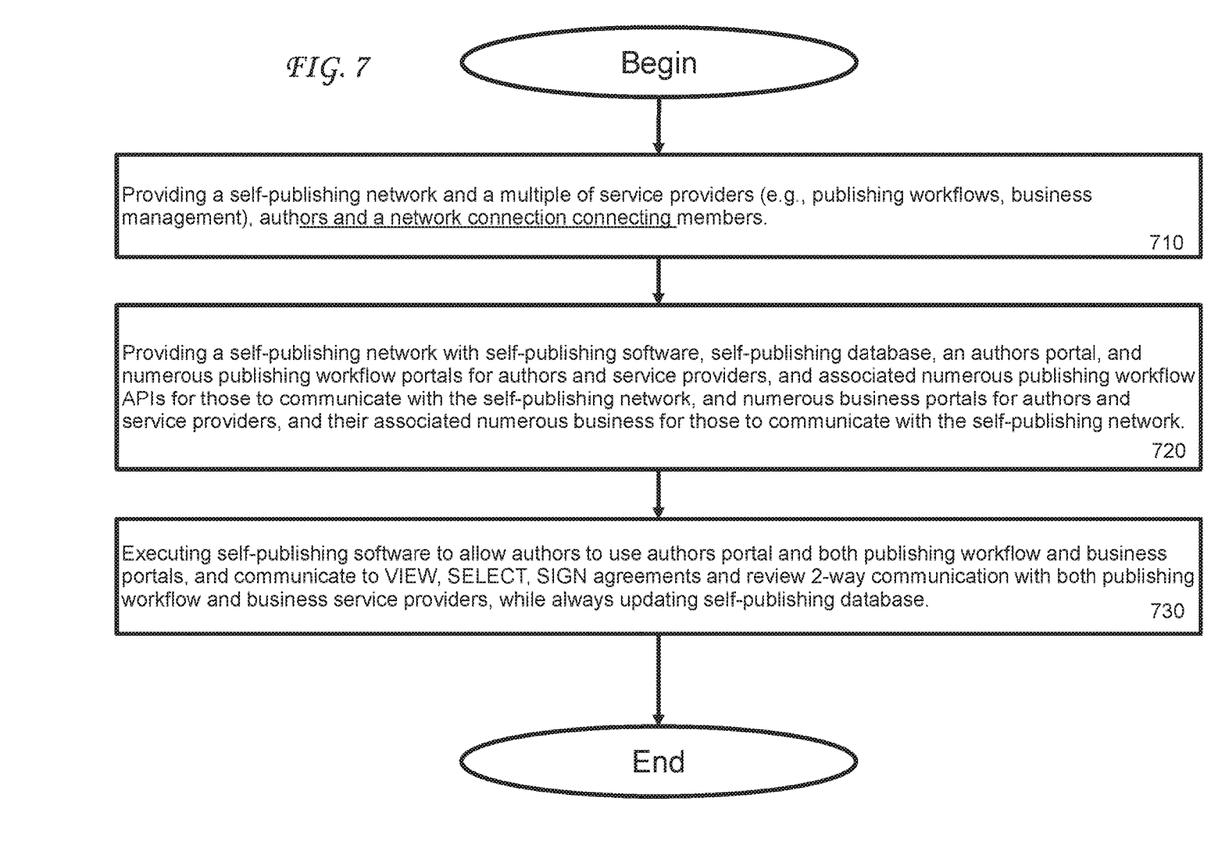
FIG. 7 illustrates an exemplary overall method of the present invention as described herein.

FIG. 7 illustrates an exemplary overall method of the present invention as described herein.

At step 710, the method includes providing a self-publishing network and a multiple of service providers (e.g., publishing workflows, business management), authors and a network connection connecting members. Providing a self-publishing network and a multiple of service providers (e.g., publishing workflows, business management), authors and a network connection connecting members.

At step 720, the method includes providing a self-publishing network 165 with self-publishing software 215, self-publishing database 220, an authors portal 225, and numerous publishing workflow portals 295 and business portals 290 for authors and service providers. Step 720 of the method also concerns providing associated numerous publishing workflow APIs and business APIs, respectively, for the publishing workflow portals 295 and business portals 290 to communicate with the self-publishing network 165.

At step 730, the method includes executing the self-publishing software 215 to allow authors to use authors portal and author GUIs of both publishing workflow and business portals, and communicate to VIEW, SELECT, SIGN agreements and review 2-way communication with both publishing workflow and business service providers, while always updating self-publishing database 220.

Figure 8:
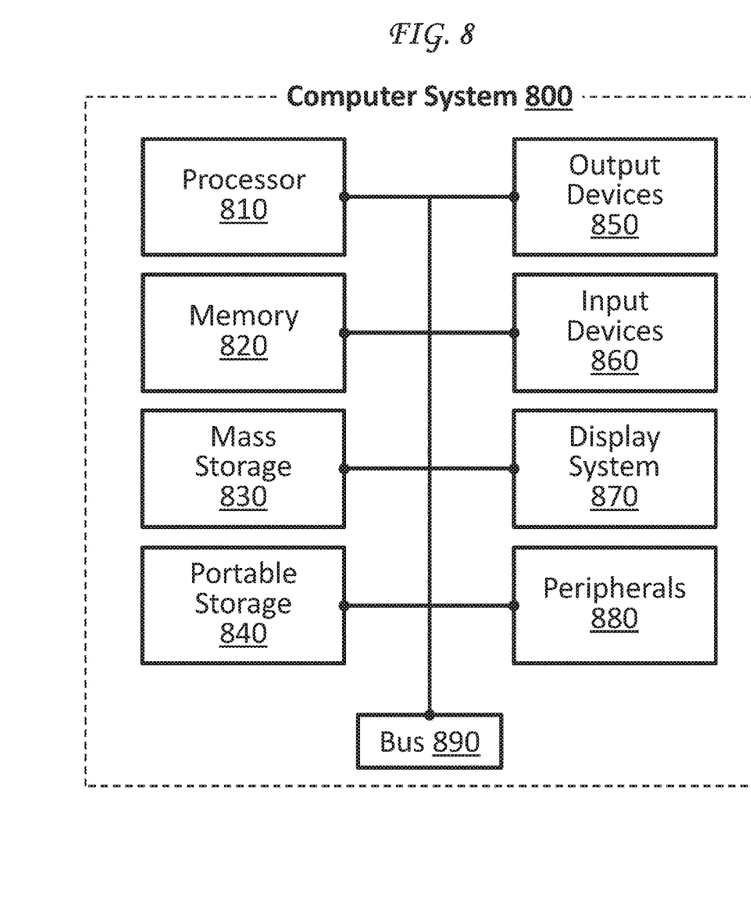
FIG. 8 is a block diagram of an exemplary computing device that may be used to implement an embodiment of the present invention.

FIG. 8 illustrates an exemplary computing system 800 that may be used to implement an embodiment of the present invention. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD), a plasma display, an organic light-emitting diode (OLED) display, an electronic ink display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, tablet computing device, video game console, e-book reader, media player device, vehicle-based computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing services for authors, the method comprising:
   receiving an author profile from an author device, the author profile identifying a user account of an author;
   receiving a manuscript from the author device, the manuscript associated with the author;
   receiving a time requirement from the author device, the time requirement identifying a time period within which a service must be completed;
   receiving a financial requirement from the author device, the financial requirement identifying a budget for performance of the service;
   transmitting a service provider list to the author device, the service provider list identifying a plurality of service providers whose schedules are indicative of availability within the time period within which the service must be completed and whose costs are within the budget for performance of the service;

receiving a service provider selection from the author device, the service provider selection identifying a selected service provider from the service provider list;

generating a project schedule interface based on the time period within which the service must be completed and the schedules of the plurality of service providers;

generating an agreement between the author and the selected service provider;

transmitting the agreement to both the author device and a selected service provider device associated with the selected service provider;

receiving an author image-based signature and an author digital certificate signature from the author device;

receiving a selected service provider image-based signature and a selected service provider digital certificate signature from the selected service provider device;

verifying the author image-based signature and the selected service provider image-based signature against a database of valid image-based signatures;

verifying the author digital certificate signature and the selected service provider digital certificate signature via a certificate authority;

updating the project schedule interface in response to verifying the author digital certificate signature and the selected service provider digital certificate signature and to verifying the author image-based signature and the selected service provider image-based signature; and transmitting at least a subset of the manuscript to the selected service provider device in response to verifying the author digital certificate signature and the selected service provider digital certificate signature and to verifying the author image-based signature and the selected service provider image-based signature.

2. The method of claim 1, further comprising:
receiving an edited copy of the manuscript from the selected service provider device, wherein the selected service provider is an editor; and
transmitting the edited copy of the manuscript to the author device.

3. The method of claim 1, wherein the author device is one of a smartphone, a tablet computing device, a laptop computer, a desktop computer, a electronic book reader device, a video game console, a media player device, a vehicle-based computer, or some combination thereof.

4. The method of claim 1, further comprising:
receiving a communication request; and
providing a communication connection between the author device and the selected service provider device, the communication connection transferring at least one of audio call data or video call data between the author device and the selected service provider device over a duration of time.

5. The method of claim 4, wherein the communication request is received from one of the author device or the selected service provider device.

6. The method of claim 1, further comprising:
receiving a text-based communication from the author device; and
transmitting the text-based communication to the selected service provider device.

7. The method of claim 1, further comprising:
receiving a text-based communication from the selected service provider device; and
transmitting the text-based communication to the author device.

8. The method of claim 1, wherein the selected service provider device is one of a smartphone, a tablet computing device, a laptop computer, a desktop computer, a electronic book reader device, a video game console, a media player device, a vehicle-based computer, or some combination thereof.

9. The method of claim 1, wherein the service provider list includes ratings of each service provider of the plurality of service providers, the ratings falling within a predetermined rating range, the ratings stored at one or more review network devices and provided by one or more reviewer devices.

10. The method of claim 1, further comprising transmitting a scheduler interface to the author device, the scheduler interface identifying a level of progress based on a plurality of progress stages of the service between the author and the selected service provider, the scheduler interface also identifying a secondary level of progress of a secondary service other than the service, the secondary service associated with a secondary service provider other than the selected service provider of the plurality of service providers.

11. The method of claim 1, wherein the plurality of service providers identified by the service provider list are personal contacts of the author.

12. The method of claim 1, wherein the plurality of service providers identified by the service provider list are associated with a selected genre specialization, further comprising:
receiving a market requirement identifying the selected genre specialization.

13. The method of claim 1, further comprising:
storing a previous version of the manuscript; and
modifying the manuscript to revert the manuscript to the previous version of the manuscript.

14. The method of claim 1, wherein the selected service provider is an editor, a historical researcher, a typographer, a formatter, a cover designer, a reviewer, a copy editor, an illustrator, a colorist, a proofreader, a type designer, or some combination thereof.

15. The method of claim 1, further comprising publishing the manuscript.

16. The method of claim 1, wherein the plurality of service providers identified by the service provider list do not conflict with a previously used service provider that was previously used by the author.

17. A system for providing services for authors, the system comprising:
a communication transceiver that is communicatively coupled to at least an author device and a plurality of service provider devices associated with a plurality of service providers, wherein the communication transceiver receives an author profile and a manuscript and a time requirement and a financial requirement from the author device, the author profile identifying a user account of an author, the manuscript associated with the author, the time requirement identifying a time period within which a service must be completed, the financial requirement identifying a budget for performance of the service;
a memory that stores instructions: and
a processor coupled to the memory and to the communication transceiver, wherein execution of the instructions by the processor:
transmits a service provider list to the author device via the communication transceiver, the service provider list identifying a plurality of service providers whose schedules are indicative of availability within the time period within which the service must be completed and whose costs are within the budget for performance of the service;

receives a service provider selection from the author device via the communication transceiver, the service provider selection identifying a selected service provider from the service provider list;

generates a project schedule interface based on the time period within which the service must be completed and the schedules of the plurality of service providers;

generates an agreement between the author and the selected service provider;

transmits the agreement to both the author device and a selected service provider device associated with the selected service provider;

receives an author image-based signature and an author digital certificate signature from the author device;

receives a selected service provider image-based signature and a selected service provider digital certificate signature from the selected service provider device;

verifies the author image-based signature and the selected service provider image-based signature against a database of valid image-based signatures;

verifies the author digital certificate signature and the selected service provider digital certificate signature via a certificate authority;

updates the project schedule interface in response to verifying the author digital certificate signature and the selected service provider digital certificate signature and to verifying the author image-based signature and the selected service provider image-based signature; and transmits at least a subset of the manuscript to the selected service provider device in response to verifying the author image-based signature, the author digital certificate signature, the selected service provider image-based signature, and the selected service provider digital certificate signature.

18. The system of claim 17, wherein the communication transceiver is communicatively coupled to at least a subset of the author device and the plurality of service provider devices through at least one of an Internet connection or a private network connection.

19. The system of claim 17, further comprising a database storing at least the manuscript, the agreement, and a history of interactions between the author device and the selected service provider device.

20. A non-transitory computer-readable storage medium, having embodied thereon a program executable by a processor to perform a method for providing services for authors, the method comprising:

receiving an author profile from an author device, the author profile identifying a user account of an author;

receiving a manuscript from the author device, the manuscript associated with the author;

receiving a time requirement from the author device, the time requirement identifying a time period within which a service must be completed;

receiving a financial requirement from the author device, the financial requirement identifying a budget for performance of the service;

transmitting a service provider list to the author device, the service provider list identifying a plurality of service providers whose schedules are indicative of availability within the time period within which the service must be completed and whose costs are within the budget for performance of the service;

receiving a service provider selection from the author device, the service provider selection identifying a selected service provider from the service provider list;

generating a project schedule interface based on the time period within which the service must be completed and the schedules of the plurality of service providers;

generating an agreement between the author and the service provider;

transmitting the agreement to both the author device and a selected service provider device associated with the selected service provider;

receiving an author image-based signature and an author digital certificate signature from the author device;

receiving a selected service provider image-based signature and a selected service provider digital certificate signature from the selected service provider device;

verifying the author image-based signature and the selected service provider image-based signature against a database of valid image-based signatures;

verifying the author digital certificate signature and the selected service provider digital certificate signature via a certificate authority;

updating the project schedule interface in response to verifying the author digital certificate signature and the selected service provider digital certificate signature and to verifying the author image-based signature and the selected service provider image-based signature; and transmitting at least a subset of the manuscript to the selected service provider device in response to verifying the author image-based signature, the author digital certificate signature, the selected service provider image-based signature, and the selected service provider digital certificate signature.

* * * * *